P. BURNS.
AUTOMATIC DRAINING ATTACHMENT FOR VALVES.
APPLICATION FILED OCT. 26, 1912.
1,126,385.
Patented Jan. 26, 1915.
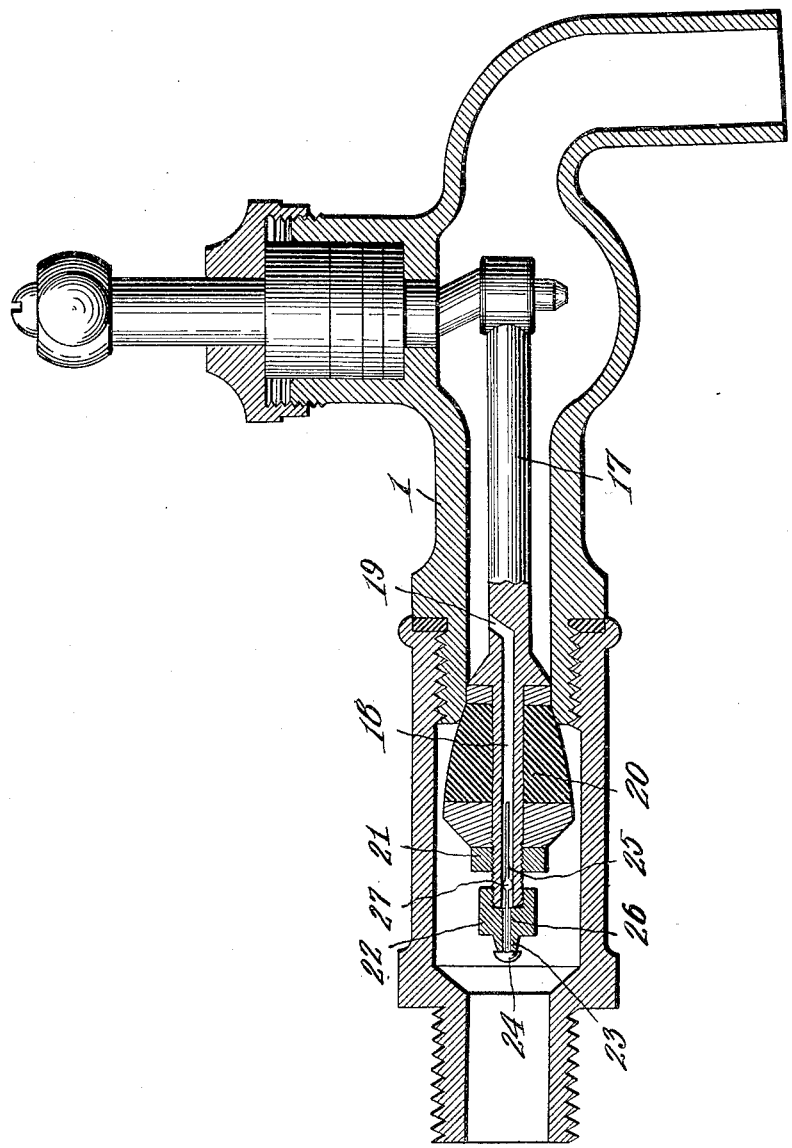
Witnesses
Paul Burns,
Inventor
by C. A. Snow & Co.
Attorneys

UNITED STATES PATENT OFFICE.

PAUL BURNS, OF HARTSVILLE, SOUTH CAROLINA.

AUTOMATIC DRAINING ATTACHMENT FOR VALVES.

1,126,385. Specification of Letters Patent. Patented Jan. 26, 1915.

Application filed October 26, 1912. Serial No. 727,987.

*To all whom it may concern:*

Be it known that I, PAUL BURNS, a citizen of the United States, residing at Hartsville, in the county of Darlington and State of South Carolina, have invented a new and useful Automatic Draining Attachment for Valves, of which the following is a specification.

This invention relates to a drain attachment for faucets and the like, its object being to admit air to the pipes and thus permit water to drain through the stop and waste valve when pressure is cut off from the pipe to which the faucet is connected, this action of the attachment being automatic so that, when the attachment is in position, there is no danger of pipes freezing should they be left undrained within a building from which the water supply has been cut off.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing, which is a section through a Fuller bib, one form of the present invention has been shown. Referring to the drawing by characters of reference 1 designates a Fuller bib and the valve stem 17 of this Fuller bib has a central bore 18 communicating, at its outer end, with a substantially radial bore 19. The rubber ball of the valve has been indicated at 20 and is held on the stem 17 in the usual manner, as by means of a nut 21. A counter-bored cap 22 engages the inner end of the stem and has a central nipple 23 constituting a seat for the head 24 of the supplemental valve. The stem 25 of this supplemental valve extends loosely through the bore 26 in cap 22 and into the bore 18 in stem 17. This stem 25 has a flattened portion 27 designed to abut against the cap 22 so as to limit the longitudinal movement of the valve 24 in one direction.

When the valve is closed the pressure of water thereagainst will force the valve 24 against nipple 23 thereby closing the bore 26 and preventing leakage of water into said bore. When the valve is in this position the bore 19 is in communication with the outlet of the bib. If, however, the pressure of water against the valve 24 should be removed, as by cutting off the supply of water to the pipe leading to the bib, the said valve 24 would promptly shift until the enlargement 27 comes against the inner end of the bore 26. The air is then free to enter the pipes through the bib and permit the water in the pipes to drain outwardly through the stop and waste valve commonly provided.

What is claimed is:—

A bib including a stem having a longitudinal bore in one end, the inner end of the bore being provided with an inclined outlet, the free end of the stem being exteriorly screw threaded, a cap having an axial bore and a counter bore, said counter bore being threaded for engaging the threaded end of the stem, the bore in the cap being of less diameter than and alining with the bore in the stem, whereby said cap forms a shoulder extending partly across the end of the bore in the stem, a cup-like supplemental valve for closing the outer end of the bore in the cap, a stem projecting from the valve and through the bore in the cap and into the bore in the first named stem, said stem of the valve being slidable within the said bores and having a flattened portion movable against the cap to hold said last named stem against removal from the cap.

In testimony that I claim the foregoing as my own, I have hereto affixed my signature in the presence of two witnesses.

PAUL BURNS.

Witnesses:
C. S. McCAUTS,
R. J. FLETCHER.

Copies of this patent may be obtained for five cents each, by addressing the "Commissioner of Patents, Washington, D. C."